Oct. 6, 1942.   W. B. HUTCHINGS   2,297,768
LIQUID CIRCULATOR AND HEATER FOR TANKS
Filed Jan. 22, 1941
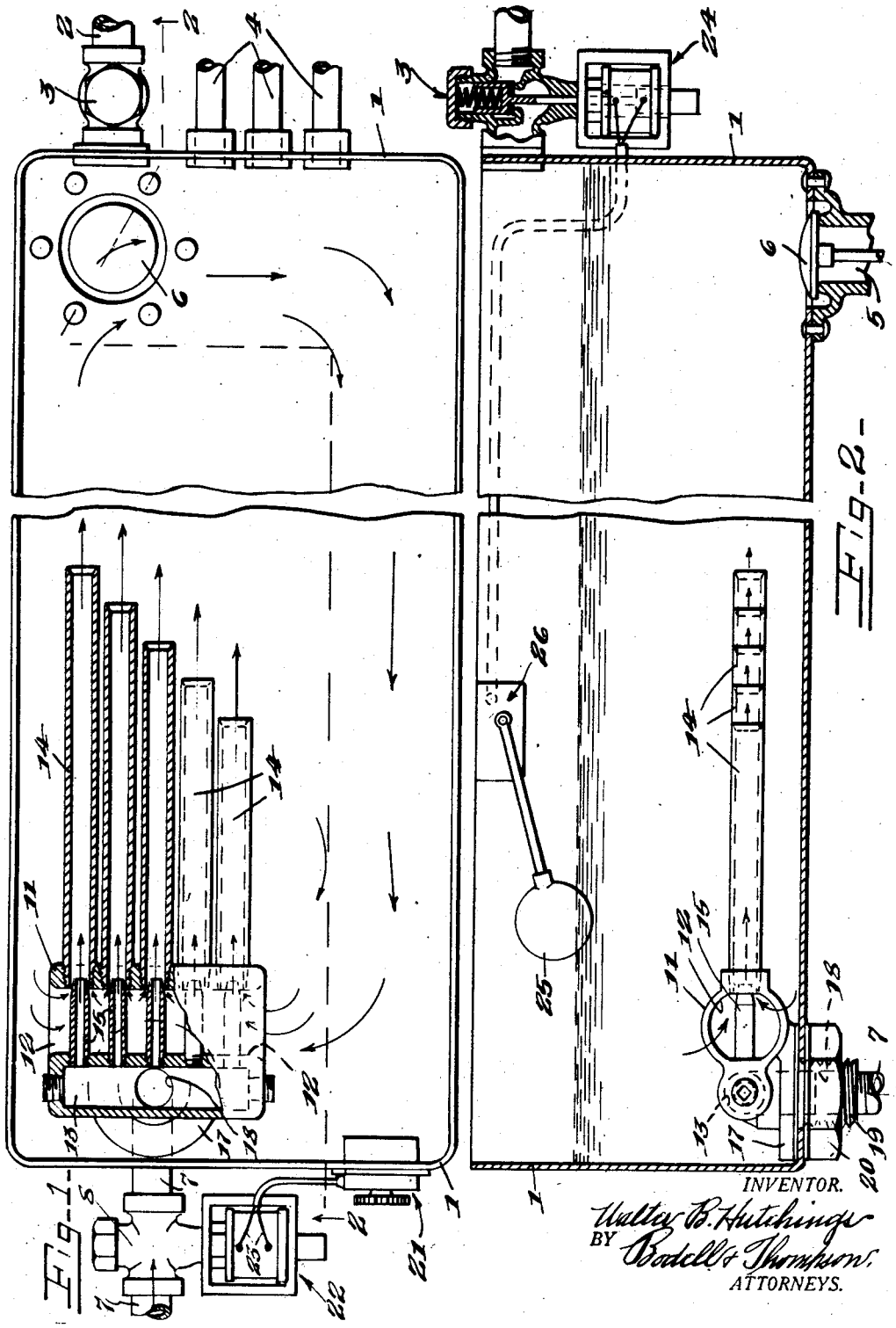
INVENTOR.
Walter B. Hutchings
BY Badell & Thompson
ATTORNEYS.

Patented Oct. 6, 1942

2,297,768

UNITED STATES PATENT OFFICE 2,297,768

LIQUID CIRCULATOR AND HEATER FOR TANKS

Walter B. Hutchings, Huron, S. Dak., assignor to The Prosperity Company, Inc., Syracuse, N. Y., a corporation of New York Application January 22, 1941, Serial No. 375,471

2 Claims. (Cl. 261—77)

This invention relates to a heater and circulator for liquid in tanks, and especially for heating the liquid or water for use in commercial laundry washing machines and the like.

It has for its object a heater by which the water in the tank is quickly and uniformly heated by circulating small confined quantities in intimate contact with the heated gas or steam.

It further has for its object a heater in which the heating medium, as steam, is injected into the water in such a manner as to cause circulation and mixture with the water while the water is being drawn by the injector action through a relatively small elongated passage or passages.

It further has for its object an arrangement of a plurality of injector passages or tubes through which the water is circulated by the injector action in such a manner that vibration and noise are eliminated, or the vibrations and noise that would otherwise be caused by one or more tubes, are neutralized or cancelled out by the vibration in the other tubes or tube.

It further has for its object a heater which is readily applied as a unit to the tank.

The invention consists in the novel features and in the combinations and constructions hereinafter set forth and claimed.

In describing this invention, reference is had to the accompanying drawing in which like characters designate corresponding parts in all the views.

Figure 1 is a fragmentary top plan, partly in section, of this heater, the same being shown as applied to a mixing tank.

Figure 2 is a longitudinal sectional view on the line 2—2, Figure 1.

1 designates a mixing tank, which is here shown as oblong in general form, the tank here shown being usually a tank for preparing as to temperature and quantity, the washing liquid to be used in the commercial washing machine. While the washing machine is performing one operation, the fluid for the next operation is being prepared in the tank. 2 designates an intake pipe for connection to a suitable water supply, this having a valve 3 therein.

4 designates, generally, conduits through which ingredients, or chemical agents, as soap, bleach, sour, etc., may be supplied to the water in the tank.

5 designates an outlet controlled by a dump valve, as 6, this outlet leading to the washing machine.

7 is a steam pipe having a control valve 8 therein, this pipe communicating with the steam chamber of the heater to be presently described.

The heater is so constructed as to be readily applied as a unit to the tank, and comprises a body 11 formed with one or more inlets 12 into the tank and also with a steam chamber, as 13, which is connected to the valve controlled pipe 7. The heater also includes a plurality of elongated outlet passages or tubes 14 communicating with the body 11 and injector nozzles 15, one for each tube 14, the nozzles communicating with the steam chamber 13 and having their ends projecting slightly into the inner ends of the tubes 14 and so relatively arranged thereto and to the inlet passages 12 of the body that when steam, under pressure, is passing through the nozzles, the liquid or water is drawn from the tank through the inlet passages 12 and passed by the injector action through the tubes 14. While passing therethrough, the steam comes into intimate contact with and mixes with the relatively small quantity of water in the tubes, so that the water is quickly heated in the tubes, and hence the entire volume of water quickly heated, due to the rapid circulation of the water through the tubes 14 by the injector action.

As the injector action sets up undesirable vibrations and noises, the nozzles are so arranged that the vibrations thereof cancel out or neutralize each other, and as here shown, the tubes are all of substantially the same diameter, but arranged with their discharge ends out of transverse alinement. Preferably, this is effected by making the tubes of different lengths. As here illustrated, the discharge ends of the tubes are arranged in step formation or in echelon.

The body 11 is formed with a base 17 through which the inlet passage 18 to the chamber is located, this base having a threaded tubular stem 19 extending through a wall, as the bottom of the tank, and to which the pipe 7 is coupled, the base 17 being clamped in position by a nut 20 screwing on the stem 19 against the bottom of the tank. Obviously, the heater is a unit which can be readily and quickly applied to the tank.

The valves 3, 6, 8, 9 are usually self-closing and automatically opened by a cycle timer controlling the operations of the washing machine, as well as the operations of the tank including a temperature control. The program or formulae sheet of the timer calls for different water temperatures and levels for different operations, and usually the setting of the temperature controls and the level control are automatically effected by the timer. However, this automatic feature forms no part of this invention.

21 designates a temperature control, which controls the opening and closing of the steam valve 8 through electro-responsive device designated 22, the circuit through the wires 23 to this device being controlled by the timer through the temperature control 21. Likewise, the opening and closing of the water valve or valves 3 are effected by a similar electro-responsive device 24 controlled by the timer, and is also controlled by suitable means, as a float 25, in the tank, which serves to operate a suitable switch 26 to open the circuit through the electro-responsive device 24 to permit the valve 3 to close independently of the timer, when a predetermined level is reached in the tank 1. The dump valve 6 is similarly operated.

In the general operation of the heater, when the predetermined temperature is called for by the program or formulae sheet of the timer, the circuit is closed through the electro-responsive device 22 to open the valve 8, the water valve or valve 3 having been opened also by the timer. With the valve 8 open, steam passes through the pipe 7 to the steam chamber 13 of the body 11 of the heater through the nozzles 15 and the tubes 13, setting up an injector action, drawing the water from the tank through the inlet passages 12 of the body and through the tubes 14, so that the water is quickly heated and circulated. When the predetermined temperature is reached, the temperature control 21 automatically closes the valve 8, and if the temperature falls below a predetermined point, before the desired water level is reached, the valve 8 is again automatically opened by the device 21. Owing to the plurality of nozzles and the arrangement thereof, comparatively large heat exchange surfaces or facilitates are provided within minimum space and also owing to the arrangement of the discharge tubes, vibrations and noise that would otherwise occur, are eliminated.

What I claim is:

1. The combination with a tank for a liquid rectangular in general form; of a liquid circulator and heater mounted therein comprising a body mounted on the bottom of the tank having inlets laterally extending into the tank and also a steam chamber for connection to a source of steam, outlet tubes projecting from the body, and injector nozzles communicating with the steam chamber and extending into the inner ends of the tubes, the tubes overhanging and spaced from the bottom of the tank, and the tubes being of different lengths all so that the vibrations set up by the injector and circulation actions in each tube are substantially neutralized by that in the other tubes.

2. The combination with a tank for a liquid rectangular in general form; of a liquid circulator and heater mounted therein comprising a body mounted on the bottom of the tank and for the most part spaced from the bottom of the tank, the body having inlets opening laterally into the tank and also a steam chamber for connection to a source of steam, the body being arranged on one side of the median line of the tank, outlet tubes projecting from the body and overhanging and spaced from the bottom of the tank, injector nozzles communicating with the steam chamber and extending into the inner ends of the tubes, the tubes being parallel and of different lengths, and arranged with their outer ends in echelon with the longer tube adjacent one side of the tank and the shortest tube toward the center of the tank.

WALTER B. HUTCHINGS.